(12) United States Patent
Olsen

(10) Patent No.: US 6,315,130 B1
(45) Date of Patent: Nov. 13, 2001

(54) PLEATED FILTER ELEMENT

(75) Inventor: Daniel K. Olsen, North Branford, CT (US)

(73) Assignee: Cuno Incorporated, Meriden, CT (US)

( * ) Notice: Subject to any disclaimer, the term of this patent is extended or adjusted under 35 U.S.C. 154(b) by 0 days.

(21) Appl. No.: 09/479,686

(22) Filed: Jan. 7, 2000

Related U.S. Application Data (60) Provisional application No. 60/115,024, filed on Jan. 7, 1999.

(51) Int. Cl.[7] ................................................ B01D 27/06
(52) U.S. Cl. ........................ 210/490; 210/491; 210/493.1; 55/521
(58) Field of Search .................................... 210/487, 489, 210/490, 491, 493.1, 493.2, 493.5; 55/521

(56) References Cited

U.S. PATENT DOCUMENTS

| | | |
|---|---|---|
| 2,627,350 | 2/1953 | Wicks . |
| 3,022,861 | 2/1962 | Harms . |
| 3,799,354 | 3/1974 | Buckman et al. . |
| 4,181,070 | 1/1980 | Robbins et al. . |
| 4,184,966 * | 1/1980 | Pall ................................... 210/493.2 |
| 4,201,119 | 5/1980 | Wolf . |
| 4,465,213 | 8/1984 | Lehmann et al. . |
| 4,465,214 | 8/1984 | Feiten et al. . |
| 4,663,041 * | 5/1987 | Miyagi et al. ..................... 210/493.5 |
| 4,673,503 | 6/1987 | Fujimoto . |
| 5,120,296 | 6/1992 | Yamaguchi et al. . |
| 5,876,601 | 3/1999 | Geibel et al. . |
| 5,882,288 | 3/1999 | Paul et al. . |

FOREIGN PATENT DOCUMENTS

| | | |
|---|---|---|
| 735842 | 8/1955 | (GB) . |
| 1196534 | 6/1970 | (GB) . |
| 60-61017 * | 4/1985 | (JP) ................................... 210/493.5 |

* cited by examiner

*Primary Examiner*—Matthew O. Savage
(74) *Attorney, Agent, or Firm*—Cummings & Lockwood

(57) ABSTRACT

A filter element according to the present disclosure includes a plurality of longitudinally extending pleats including outwardly radiating primary pleats and inwardly radiating secondary pleats, with at least one secondary pleat positioned between two adjacent primary pleats. Each primary pleat has a predetermined radial height, and each secondary pleat has a radial height that is less than the radial height of each primary pleat and different from the radial height of at least one other secondary pleat. A filter element according to the present disclosure provides greater filter area, an increased overall filter density, and access to more radial flow paths at the outer diameter of the filter element.

28 Claims, 4 Drawing Sheets

FIG_1

FIG. 3

FIG_3a

FIG_3b

FIG_3c

PLEATED FILTER ELEMENT

CROSS-REFERENCE TO RELATED APPLICATION

The present application claims priority to U.S. Provisional Patent Application Serial No. 60/115,024, filed Jan. 7, 1999, the disclosure of which is incorporated herein by reference its entirety.

BACKGROUND OF THE DISCLOSURE

1. Field of the Disclosure

The present disclosure relates to a fluid filtering device and, more particularly, to a pleated filter element and a method of forming a pleated filter element. Even more particularly, the present disclosure relates to a pleated filter element having a modified W-pleat construction, and a method of forming such a filter element.

2. Background of the Related Art

Filtration is the process of separating particles, or contaminants from a fluid (liquid or gas), and can be accomplished by passing the fluid through a porous filter medium that stops or captures the particles while permitting the fluid to pass there through. Such fluid filtering is used extensively in the manufacture of polymer products, medicinal products, mineral and metallurgical processing, petroleum refining, water purification, emissions control, and in beverage and food preparation.

Most conventional filter media may be categorized into two broad categories: a surface-type filter medium and a depth-type filter medium. As its name implies, the surface-type filter medium stops fluid contaminants on its surface. Examples of surface-type filter media are calendered melt-blown material, cellulose and/or paper, membranes, woven screen, porous metal, and porous non-woven material. In contrast, a depth-type filter medium captures contaminants within the medium, i.e. between an upstream surface and a downstream surface of the medium. An example of a depth-type filter medium is a resin bonded filter.

In general, as a fluid is forced through the filter medium and filtered, over time the pressure drop across the filter medium will gradually increase. Such increase is due to the collection of particles, or contaminants on the filter medium, i.e., the filter medium gradually becomes loaded with the contaminants trapped or stopped thereby. An increasing pressure drop across the filter medium, however, translates into an increasing load on the means (such as a blower or pump) employed to force the fluid through the filter medium. In addition, since the life of a filter is generally defined by a maximum allowable pressure drop, a slower increase in pressure drop translates into a longer filter life.

When a surface-type filter medium is used, one method of minimizing the pressure drop across the filter medium is to maximize the available surface area of the filter medium. In order to increase the surface area in a surface-type filter, pleated filter media have been developed. Pleated surface-type filters typically include relatively thin cellulosic or synthetic filter media that is folded in an accordion-like fashion to produce a plurality of pleats. Each pleat is typically made up of a pair of rectangular panels, with fold lines separating the panels.

In a cylindrical pleated filter element, the short sides of the rectangular panels of the pleats usually extend radially outwardly with respect to the axis of the filter element, and thus provide the radial height of the pleats, while the long sides of the rectangular panels of the pleats extend axially between ends of the filter element. The maximum number of full pleats (i.e., pleats that extend between the inner and outer diameters of the filter element) is determined by an inner circumference of the filter element divided by the thickness of the pleats.

Because of the radial geometry of the pleats in a cylindrical pleated filter element, however, there is a significant degree of spacing between outer tips of the pleats. In order to minimize the spacing between outer tips of the pleats, filter elements having larger inner diameters and, thus, shorter pleat heights have been used. Furthermore, spiral pleat filters and "W-pleat" filters have been developed in order to minimize pleat spacing and provide even more filtering surface area.

A W-pleat filter element is comparable to a standard pleated filter element in that it includes a plurality of longitudinal pleats disposed in a cylindrical configuration. The W-pleat filter element, however, also includes relatively short pleats extending radially inward from the outer periphery of the filter between the pleats of standard height. The short pleats are the same height and arise at a uniform frequency about the circumference of the filter, i.e., there is one short pleat between every two full-length pleats. Examples of W-pleat filters can be found in U.S. Pat. Nos. 2,627,350 (1953) to Wicks; U.S. Pat. No. 3,002,861 (1962) to Harms; 3,799,354 (1974) to Buckman et al.; and German Patent No. 3,935,503 (1991) to Nick et al. Most W-pleat filters are made using cam-actuated pleating machines that only provide repetitive and uniform pleat patterns, resulting in short pleats of the same height and arising at a uniform frequency.

One problem associated with the W-pleat construction, however, is a less than optimum pleat density and the migration of the shortened pleats towards the axis of the filter. Such migration is undesired because it can cause binding, blockages, increased pressure drops across the filter, reduced filter lives, and damage the filter media.

A spiral pleat filter element is comparable to a standard pleated filter in that it includes a plurality of longitudinal pleats disposed in a cylindrical configuration. In a spiral pleat filter, however, the ends of the pleats are rolled over to minimize the spacing between adjacent pleat surfaces near an outer diameter of the filter element, such that more filter surface area can be provided in a filter of equal diameter. Examples of spiral pleated filters can be found in U.S. Pat. Nos. 2,395,449, 2,401,222 and 2,420,414 (1946) to Briggs; 2,801,001 (1957) to Bowers; and 5,543,047 (1996) and 5,690,765 (1997) to Stoyell et al.

While both the spiral pleat and the W-pleat designs provide surface-type filters with increased filter surface area, the spiral pleat designs do not have the pleat migration problems associated with the W-pleat designs. As compared with a W-pleat filter, however, the rolled-over pleats of a spiral pleated filter provide fewer and more difficult to access radial flow paths near the outer diameter of the filter, leading to a greater pressure drop across the filter. In addition, the rolled-over pleats of a spiral pleated filter provide longer flow paths and, therefore, a greater chance of the flow paths becoming blocked in high load or large particle contaminant applications.

Furthermore, spiral pleated filters are more difficult to axially insert into a cylindrical cage of a cartridge assembly incorporating the filter element, since the rolled-over pleats have a tendency to straighten out prior to being inserted into the cage. Inserting a spiral pleated filter element into a cage creates drag, which can cause damage to the filter media and can, as a practical matter, limit the axial length of a filter cartridge incorporating a spiral pleated filter element.

What is still needed, accordingly, is a filter element that provides filter surface area gains comparable to a spiral pleated filter, yet has increased radial flow paths at the outer diameter of the filter, and is conducive to being inserted into an elongated cylindrical cage. There is also a need for a pleated filter design that prevents pleat migration.

SUMMARY OF THE DISCLOSURE

A filter element constructed according to the present disclosure has a plurality of longitudinally extending pleats including outwardly radiating primary pleats and inwardly radiating secondary pleats, with at least one secondary pleat positioned between two adjacent primary pleats. Each primary pleat has a predetermined radial height, and each secondary pleat has a radial height that is less than the radial height of each primary pleat and different from the radial height of at least one other secondary pleat.

A filter element according to the present disclosure has been found to provide improved filter area gains, a greater overall filter density between inner and outer peripheries of the filter element, and an increased number of radial flow paths available at the outer periphery of the filter. A filter element according to the present disclosure also provides improved inter-pleat support to reduce the likelihood of pleat migration and binding.

According to another aspect of the present disclosure, the filter element is preferably a pleated composite including a filter medium and at least one of an upstream diffusion medium and a downstream diffusion medium. The diffusion media provide support to the filter medium, help to efficiently distribute fluid, and ensure that flow channels formed between and within the pleats are not filled and blocked with contaminants. According to an additional aspect of the present disclosure, the pleated composite of the filter element is heat-set to further reduce the likelihood of pleat migration and binding.

The present disclosure also provides a cartridge assembly having a cylindrical cage, a cylindrical core coaxially positioned within the cylindrical cage, and a cylindrical filter element, as described above, coaxially positioned between the core and the cage. The primary pleats of the filter element each have a predetermined radial height about equal to a difference between an outer radius of the core and an inner radius of the cage.

A method of forming a filter element according to the present disclosure includes pleating filter medium to form a plurality of longitudinally extending pleats including primary pleats and secondary pleats, wherein at least one secondary pleat is positioned between two adjacent primary pleats, each primary pleat has a predetermined height, and each secondary pleat has a height that is less than the height of each primary pleat and different from the height of at least one other secondary pleat. According to one aspect, the method further includes cutting the pleated filter medium to a desired length, and forming the cut length of the pleated filter medium into a cylinder such that the primary pleats extend radially outwardly and the secondary pleats extend radially inwardly.

These and other aspects of the subject disclosure will become more readily apparent to those having ordinary skill in the art, from the following detailed disclosure of the preferred embodiments in combination with the drawings.

BRIEF DESCRIPTION OF THE DRAWINGS

So that those having ordinary skill in the art to which the present disclosure relates will more readily understand how to construct a filter element in accordance with the present disclosure, a preferred embodiment of the presently disclosed filter element will be described in detail hereinbelow with reference to the drawings wherein.

DETAILED DESCRIPTION OF THE PREFERRED EMBODIMENTS

Figure 2:
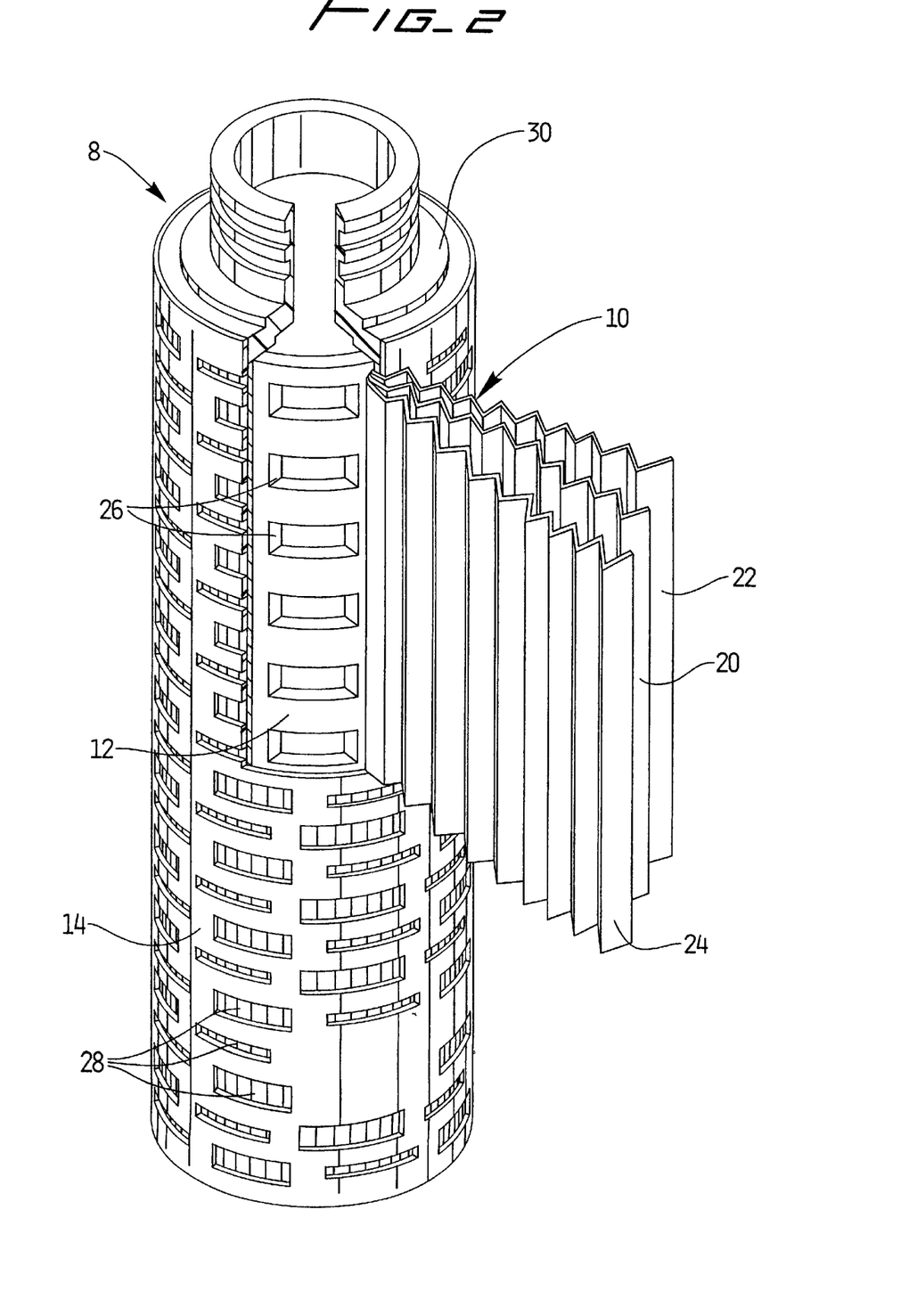
FIG. 2 is a perspective view, partially cut-away, of a cartridge assembly including the pleated filter element of FIG. 1 contained between an inner core and an outer cage of the cartridge assembly, wherein a portion of the filter element is shown unwrapped from within the cage.
Figure 3:
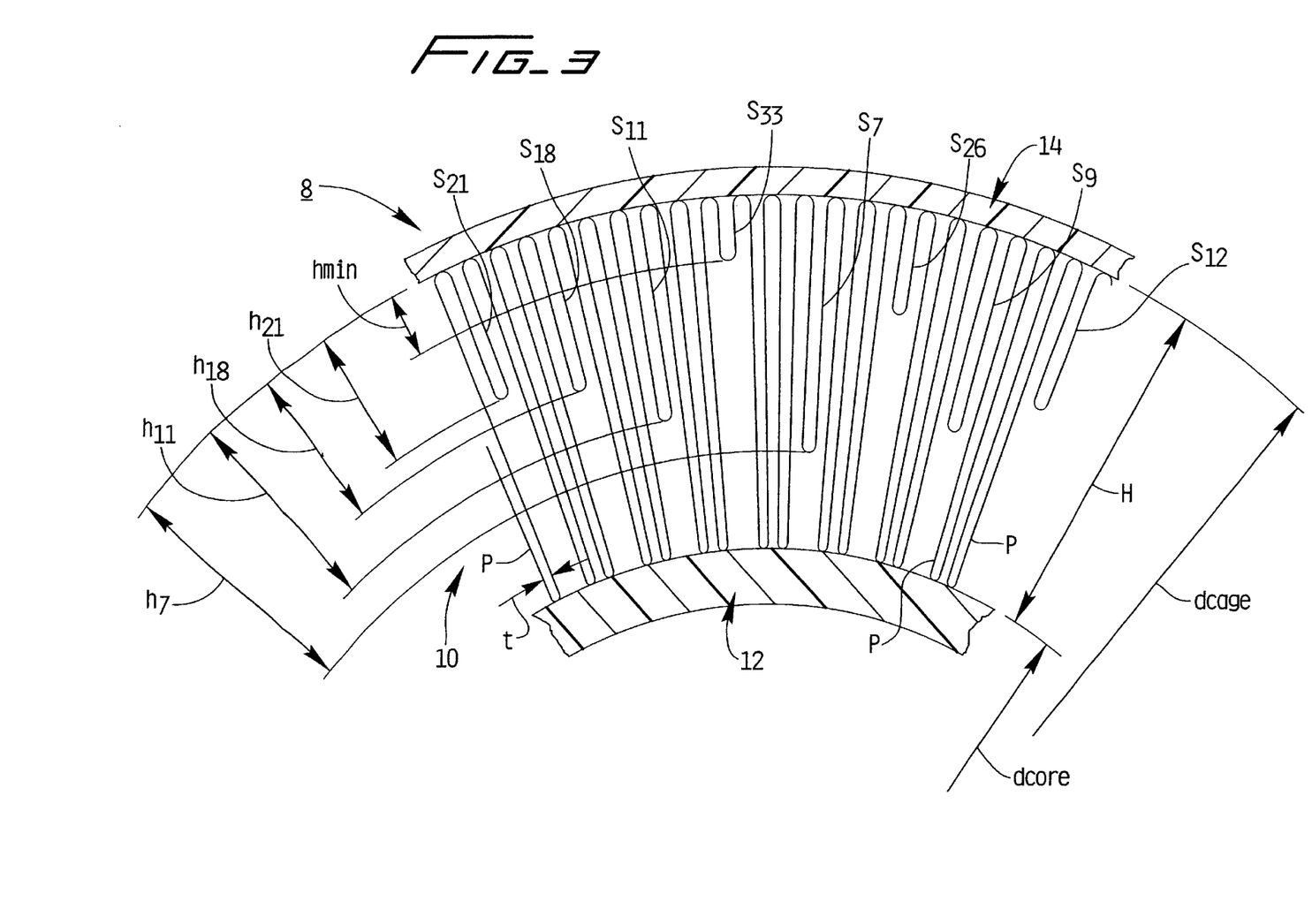
FIG. 3 is an enlarged sectional view of the cartridge assembly of FIG. 2.

Referring now to FIGS. 2 and 3, wherein like reference numerals identify similar structural elements of the present disclosure, there is illustrated a cylindrical cartridge assembly 8 including a pleated filter element 10 constructed according to the present disclosure. In addition to the cylindrical pleated filter element 10, the cartridge assembly 8 includes a cylindrical inner perforated core 12 coaxially disposed within the filter element, and a cylindrical outer perforated cage 14 coaxially disposed on the filter element.

Figure 1:
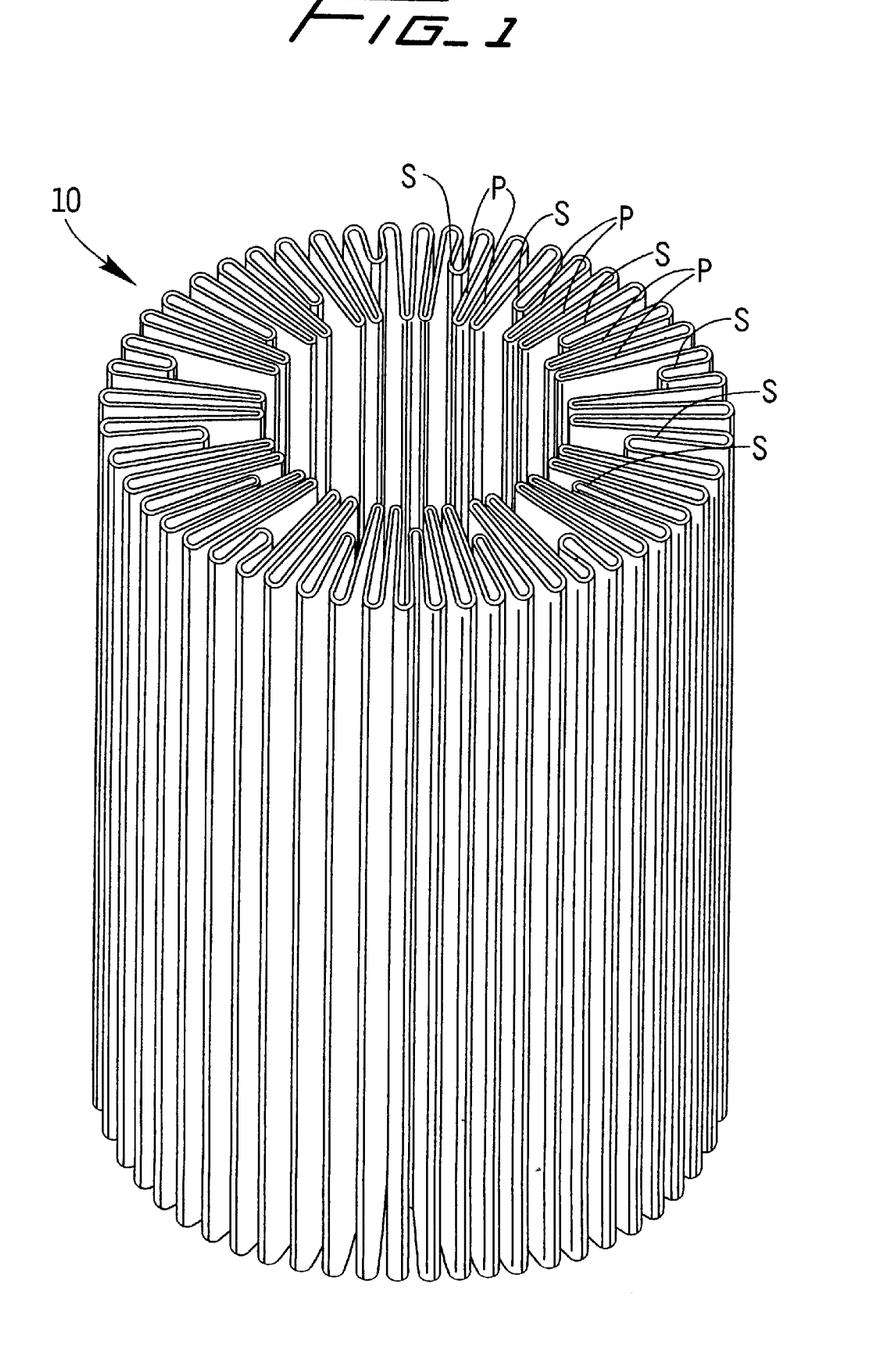
FIG. 1 is a perspective view of a pleated filter element according to the present disclosure.

Referring also to FIG. 1, the filter element 10 disclosed herein has a "modified" W-pleat construction, which will be described in greater detail hereinbelow. Such a filter element 10 has been found to provide filter area gains typical of a spiral pleated filter, with an increase in the number of available radial flow paths of the filter at the outer cage 14. In addition, such a filter element 10 has been found to provide a greater overall filter density between the inner core 12 and the outer cage 14, with the greater overall filter density improving inter-pleat support to reduce the likelihood of pleat migration and binding.

Modified W-Pleat Construction

Referring to FIGS. 1 and 3, a filter element 10 according to the present disclosure includes a plurality of longitudinally extending pleats "P" and "s" each of which has a pair of pleat legs joined to one another. The pleats include outwardly radiating primary pleats "P" and inwardly radiating secondary pleats "$s_1, s_2, s_3 \ldots s_\alpha$", where "$\alpha$" is an actual number of secondary pleats, with at least one secondary pleat positioned between two adjacent primary pleats. It should be noted that in FIGS. 1 and 3 the pleats "P" and "s" are shown spaced apart more than they actually are for purposes of illustration. In an actual filter element constructed in accordance with the present invention, the pleats are positioned closer together so that adjacent pleats touch near the core 12, whereby a greater amount of filter is fit between the core 12 and the cage 14.

Referring in particular to FIG. 3, each primary pleat "P" extends to a predetermined height "H", and the secondary pleats "$s_1, s_2, s_3 \ldots s_\alpha$" are each provided with a height "$h_1, h_2, h_3, \ldots h_\alpha$", respectively, that is less than the predetermined height "H". In other words, the legs of each inwardly radiating secondary pleat "s" are joined at roots located between the crest and the root of the adjacent primary pleats "P". Each secondary pleat "$s_1, s_2, s_3 \ldots s_\alpha$" also has a radial height "$h_1, h_2, h_3, \ldots h_\alpha$" that is different from the radial height of at least one other secondary pleat.

In the particular embodiment shown of a filter element 10 constructed in accordance with the present disclosure, each secondary pleat "$s_1, s_2, s_3 \ldots s_\alpha$" additionally has a radial height "$h_1, h_2, h_3, \ldots h_\alpha$," that is different from each of the radial heights of each other secondary pleat. It should be understood, however, that a filter element constructed in accordance with the present disclosure can alternatively be provided with secondary pleats wherein some of the secondary pleats "$s_1, s_2, s_3 \ldots s_\alpha$" have equal heights. In any event, a filter element 10 constructed in accordance with the present disclosure includes secondary pleats "$s_1, s_2, s_3 \ldots s_\alpha$" provided with eights "$h_1, h_2, h_3, \ldots h_\alpha$" that are each less than the predetermined height "H" of the primary pleats "P" and different from the radial height of at least one other secondary pleat.

The theoretical predetermined height of the primary pleats "P" is equal to half a difference between an inner and an outer diameter of the filter element 10. Preferably, the filter element 10, the inner core 12 and the outer cage 14 are sized such that the inner diameter of the filter element is about equal to an outer diameter "$d_{core}$" of the core 12, and the outer diameter of the filter element is about equal to an inner diameter "$d_{cage}$" of the cage 14. Accordingly, the theoretical predetermined height of the primary pleats "P" is preferably equal to about half a difference between the core outer diameter "$d_{core}$" and the cage inner diameter "$d_{cage}$".

Calculation of Secondary Pleat Heights

The modified W-pleat design disclosed herein provides a consistent and optimum filter density between the core outer diameter "$d_{core}$" and the cage inner diameter "$d_{cage}$". In general, a theoretical number "$\beta$" of the secondary pleats "$s_1, s_2, s_3 \ldots s_\beta$" and their individual heights "$h_1, h_2, h_3, \ldots h_\beta$" are calculated based upon the pleat thickness "t", the core outer diameter "$d_{core}$" and the cage inner diameter "$d_{cage}$".

To begin with, since only the primary pleats "P" extend from the outer cage 14 to the inner core 12, the theoretical number "n" of primary pleats "P" is generally determined by the following equation:

$$\frac{\pi d_{core}}{t}$$

Then, a secondary pleat "s" is added for every change in diameter "$\Delta d$" between the core outer diameter "$d_{core}$" and the cage inner diameter "$d_{cage}$". The change in diameter "$\Delta d$" is defined as the diameter change required to increase the circumference by one pleat thickness, and is generally determined by the following equation:

$$\frac{t}{\pi}$$

The height "$h_1, h_2, h_3, \ldots h_\beta$" of each of the secondary pleats "$s_1, s_2, s_3 \ldots s_\beta$", respectively, can then be determined by the following equations:

$$h_1 = [d_{cage} - (d_{core} + 1\, t/\pi)]/2$$

$$h_2 = [d_{cage} - (d_{core} + 2\, t/\pi)]/2$$

$$h_3 = [d_{cage} - (d_{core} + 3\, t/\pi)]/2$$

$$\vdots$$

$$h_\beta = [d_{cage} - (d_{core} + \beta\, t/\pi)]/2$$

Accordingly, a theoretical tallest secondary pleat "$s_1$" has a height "$h_1$", while a theoretical shortest secondary pleat "$s_\beta$" has a height "$h_\beta$". The theoretical total number "$\beta$" of secondary pleats "s" can be calculated by the equation:

$$(d_{cage} - d_{core})\pi/t$$

As an example, secondary pleat heights "h" of a filter element 10 pleated in accordance with the present disclosure are set forth in Table I, below. The pleated filter element 10 described in Table I is positioned between an inner core 12 having an outer diameter "$d_{core}$" of about 1.312 inches and an outer cage 14 having an inner diameter "$d_{cage}$" of about 2.455 inches. The pleated filter element 10 includes pleats "P" and "s" each having an average pleat thickness "t" of approximately 0.060 inches.

Thus, the primary pleats "P" each have a theoretical predetermined height equal to about approximately 0.572 inches, the theoretical number of primary pleats "P" is equal to about sixty-nine (69), and the change in diameter "$\Delta d$" is equal to approximately 0.0191 inches. The resulting heights "h" of the secondary pleats "s", and the theoretical number "$\beta$" of secondary pleats "s" are provided as follows:

TABLE I

Theoretical Height for each Secondary Pleat

| Secondary Pleat "s" | Secondary Pleat Height "h" (Inches) |
| --- | --- |
| $s_1$ | $h_1 = .562$ |
| $s_2$ | $h_2 = .552$ |
| $s_3$ | $h_3 = .543$ |
| $s_4$ | $h_4 = .533$ |
| $s_5$ | $h_5 = .524$ |
| $s_6$ | $h_6 = .514$ |
| $s_7$ | $h_7 = .505$ |
| $s_8$ | $h_8 = .495$ |
| $s_9$ | $h_9 = .486$ |
| $s_{10}$ | $h_{10} = .476$ |
| $s_{11}$ | $h_{11} = .466$ |
| $s_{12}$ | $h_{12} = .457$ |
| $s_{13}$ | $h_{13} = .447$ |
| $s_{14}$ | $h_{14} = .438$ |
| $s_{15}$ | $h_{15} = .428$ |
| $s_{16}$ | $h_{16} = .419$ |
| $s_{17}$ | $h_{17} = .409$ |
| $s_{18}$ | $h_{18} = .400$ |
| $s_{19}$ | $h_{19} = .390$ |
| $s_{20}$ | $h_{20} = .381$ |
| $s_{21}$ | $h_{21} = .371$ |
| $s_{22}$ | $h_{22} = .361$ |
| $s_{23}$ | $h_{23} = .352$ |
| $s_{24}$ | $h_{24} = .342$ |
| $s_{25}$ | $h_{25} = .333$ |
| $s_{26}$ | $h_{26} = .323$ |
| $s_{27}$ | $h_{27} = .314$ |
| $s_{28}$ | $h_{28} = .304$ |
| $s_{29}$ | $h_{29} = .295$ |
| $s_{30}$ | $h_{30} = .285$ |
| $s_{31}$ | $h_{31} = .275$ |
| $s_{32}$ | $h_{32} = .266$ |
| $s_{33}$ | $h_{33} = .256$ |
| $s_{34}$ | $h_{34} = .247$ |
| $s_{35}$ | $h_{35} = .237$ |
| $s_{36}$ | $h_{36} = .228$ |
| $s_{37}$ | $h_{37} = .218$ |

The pleated filter element 10 as calculated and set forth in Table I, therefore, has a theoretical total of one hundred and six (106) pleats: sixty-nine (69) primary pleats "P" and thirty-seven (37) secondary pleats "s". It should be noted that the aspects of the pleated filter element 10 set forth in Table I are only to be considered as an example, and not a limitation of the present disclosure.

Although not shown, over twenty more secondary pleats of decreasing heights "h" of between 0.199 and 0.008 inches can be included in Table I. However, secondary pleats "s" having an actual height "h" below a practical minimum height are not included in the filter element. The practical minimum height of the pleats is dependent, for example, on the capabilities of the pleating machine used to pleat the filter element, the thickness of the pleats, and the filter material. In the particular example of the pleated filter element of Table I, the practical minimum height is considered to be about 0.200 inches. Accordingly, secondary pleats "s" having an actual height "h" less than 0.200 inches are not considered for inclusion in the filter element.

Method of Pleating

The pleated filter element 10 of the present disclosure can be manufactured by a variety of techniques. In general, however, the filter and diffusion media to be pleated may be stored on separate rolls and simultaneously fed to a pleating machine and formed into a composite as the layers are pleated. After the filter composite has been pleated in accordance with the present disclosure, the filter composite is heated so that the filter composite, and in particular, the diffusion media 22, 24 thereof become heat-set.

Although not shown, the pleated, heat-set filter composite which emerges from the pleating machine is then cut to a prescribed length or prescribed number of pleats as determined by the intended dimensions of the filter element 10. The length of pleated filter composite is then formed into a cylindrical shape, and the lengthwise edges of the pleated filter composite are sealed to each other along a seam by conventional means, such as by ultrasonic welding, to retain the pleated filter composite in a cylindrical form. The cylindrical inner core 12 may then be axially inserted into the cylindrical filter element 10, the filter element and core axially inserted into the cylindrical outer cage 14, and the end caps 30 attached to the ends of the filter element to form a complete cartridge assembly 8, as shown in FIG. 1.

To provide a filter element 10 according to the present disclosure having secondary pleats "s" of varying radial heights "h", a pleating machine having independently actuated pleating blades may be used. For example, Karl Rabofsky GmbH, of Berlin, Germany, provides servo-actuated pleating machines that are suitable for producing a filter element according to the present disclosure U.S. Pat. Nos. 4,465,213 and 4,465,214, both of which are incorporated herein by reference in their entireties, disclose exemplary servo-actuated pleating machines. In particular, however, the Robofsky R178PC pleating machine has been used to provide a pleated filter element according to the present disclosure.

A program used to instruct the Robofsky R178PC pleating machine to make the filter element exemplified in Table I is shown here in Table II.

TABLE II

Program for instructing a Robofsky R178PC pleating machine to produce a pleated filter element in accordance with the present disclosure

| Program Line | Bottom Blade (movement in inches) | Top Blade (movement in inches) | Repeat | To Produce |
|---|---|---|---|---|
| 1 | 0.520 | 0.562 | 1 | extra pleat |
| 2 | 0.562 | 0.562 | 2 | P, P |
| 3 | 0.265 | 0.562 | 1 | $s_{31}$ |
| 4 | 0.562 | 0.562 | 2 | P, P |
| 5 | 0.323 | 0.562 | 1 | $s_{25}$ |
| 6 | 0.562 | 0.562 | 2 | P, P |
| 7 | 0.380 | 0.562 | 1 | $s_{19}$ |

TABLE II-continued

Program for instructing a Robofsky R178PC pleating machine to produce a pleated filter element in accordance with the present disclosure

| Program Line | Bottom Blade (movement in inches) | Top Blade (movement in inches) | Repeat | To Produce |
|---|---|---|---|---|
| 8 | 0.562 | 0.562 | 2 | P, P |
| 9 | 0.437 | 0.562 | 1 | $s_{13}$ |
| 10 | 0.562 | 0.562 | 2 | P, P |
| 11 | 0.428 | 0.562 | 1 | $s_{14}$ |
| 12 | 0.562 | 0.562 | 2 | P, P |
| 13 | 0.485 | 0.562 | 1 | $s_{8}$ |
| 14 | 0.562 | 0.562 | 2 | P, P |
| 15 | 0.250 | 0.562 | 1 | $s_{37}$ |
| 16 | 0.562 | 0.562 | 2 | P, P |
| 17 | 0.304 | 0.562 | 1 | $s_{27}$ |
| 18 | 0.562 | 0.562 | 2 | P, P |
| 19 | 0.361 | 0.562 | 1 | $s_{21}$ |
| 20 | 0.562 | 0.562 | 2 | P, P |
| 21 | 0.351 | 0.562 | 1 | $s_{22}$ |
| 22 | 0.562 | 0.562 | 2 | P, P |
| 23 | 0.409 | 0.562 | 1 | $s_{16}$ |
| 24 | 0.562 | 0.562 | 2 | P, P |
| 25 | 0.466 | 0.562 | 1 | $s_{10}$ |
| 26 | 0.562 | 0.562 | 2 | P, P |
| 27 | 0.250 | 0.562 | 1 | $s_{35}$ |
| 28 | 0.562 | 0.562 | 2 | P, P |
| 29 | 0.285 | 0.562 | 1 | $s_{29}$ |
| 30 | 0.562 | 0.562 | 2 | P, P |
| 31 | 0.275 | 0.562 | 1 | $s_{30}$ |
| 32 | 0.562 | 0.562 | 2 | P, P |
| 33 | 0.332 | 0.562 | 1 | $s_{24}$ |
| 34 | 0.562 | 0.562 | 2 | P, P |
| 35 | 0.390 | 0.562 | 1 | $s_{18}$ |
| 36 | 0.562 | 0.562 | 2 | P, P |
| 37 | 0.447 | 0.562 | 1 | $s_{12}$ |
| 38 | 0.562 | 0.562 | 2 | P, P |
| 39 | 0.250 | 0.562 | 1 | $s_{36}$ |
| 40 | 0.562 | 0.562 | 2 | P, P |
| 41 | 0.495 | 0.562 | 1 | $s_{7}$ |
| 42 | 0.562 | 0.562 | 2 | P, P |
| 43 | 0.256 | 0.562 | 1 | $s_{32}$ |
| 44 | 0.562 | 0.562 | 2 | P, P |
| 45 | 0.313 | 0.562 | 1 | $s_{26}$ |
| 46 | 0.562 | 0.562 | 2 | P, P |
| 47 | 0.371 | 0.562 | 1 | $s_{20}$ |
| 48 | 0.562 | 0.562 | 2 | P, P |
| 49 | 0.418 | 0.562 | 1 | $s_{15}$ |
| 50 | 0.562 | 0.562 | 2 | P, P |
| 51 | 0.476 | 0.562 | 1 | $s_{9}$ |
| 52 | 0.562 | 0.562 | 2 | P, P |
| 53 | 0.250 | 0.562 | 1 | $s_{34}$ |
| 54 | 0.562 | 0.562 | 2 | P, P |
| 55 | 0.294 | 0.562 | 1 | $s_{28}$ |
| 56 | 0.562 | 0.562 | 2 | P, P |
| 57 | 0.342 | 0.562 | 1 | $s_{23}$ |
| 58 | 0.562 | 0.562 | 2 | P, P |
| 59 | 0.399 | 0.562 | 1 | $s_{17}$ |
| 60 | 0.562 | 0.562 | 2 | P, P |
| 61 | 0.456 | 0.562 | 1 | $s_{11}$ |
| 62 | 0.562 | 0.562 | 2 | P, P |
| 63 | 0.250 | 0.562 | 1 | $s_{33}$ |
| 64 | 0.562 | 0.562 | 2 | P, P |
| 65 | 0.520 | 0.562 | 1 | extra pleat |

As shown by Table II, the program instructs the movement of an upper blade and a lower blade to produce the primary pleats "P" and the secondary pleats "$s_1, s_2, s_3, \ldots s_\alpha$" of the filter element 10 as disclosed herein. As also shown, the order of the secondary pleats "s" as calculated in Table I has been mixed to produce the machine instructions of Table II. The mixing of the secondary pleats "s" is done to ensure that the largest number of primary and secondary pleats "P, s" as theoretically calculated in Table I can actually fit into the predetermined dimensions of the cylindrically-shaped filter element 10.

It should be noted that each of the primary pleats "P" of the pleated filter element 10 set forth in Table I have been provided with an actual height "H" that is less than the theoretical height of the primary pleats "P" to facilitate the axial insertion of the resulting filter element 10 between the core 12 and the cage 14 to form the cartridge assembly 8. In the machine instructions of Table II, therefore, the actual height "H" of the primary pleats "P" is 0.01 inches less than the theoretical height of 0.572 inches. In addition, as a practical matter, some of the primary pleats "P" may be left out of the filter element 10 to ensure that the filter element 10 will fit between the core 12 and the cage 14. Accordingly, five (5) of the primary pleats "P" have been left out of the machine instructions of Table II, such that an actual number of primary pleats "P" is equal to the theoretical number "N" minus five.

It should also be noted that each of the secondary pleats "s" of the pleated filter element 10 set forth in Table I has been provided with an actual height that is less than the theoretical height "h". In the machine instructions of Table II, therefore, the actual height "h" of each the secondary pleats "s" is 0.01 inches less than the theoretical height "h" shown in Table I. In addition, some of the tallest secondary pleats "s" may be left out of the filter element 10 to ensure that the filter element 10 will fit between the core 12 and the cage 14. Accordingly, the six tallest secondary pleats "$s_1$, $s_2$, . . . $s_6$" have been left out of the machine instructions of Table II. Since secondary pleat "$s_6$" has an actual height "$h_6$" equal to about 0.504 inches, a predetermined maximum secondary pleat height "$h_{max}$" has been found empirically in this case to be about 0.504 inches.

The filter element 10, therefore, is pleated to include an actual number "α" of secondary pleats "s" equal to the theoretical number "β" minus the number "y" of secondary pleats having a height greater than the predetermined maximum secondary pleat height "$h_{max}$" of about 0.504 inches and less than the practical minimum pleat height of about 0.200 inches. As an alternative to leaving primary and secondary pleats out of the filter element 10 to ensure that the filter element fits in the outer cage 14, the pleat thickness "t" can be increased slightly when calculating the pleats in order to provided fewer pleats.

It has further been found that the heights "h" of the secondary pleats "s" m preferably do not fall below a preferred minimum secondary pleat height "$h_{min}$", to ensure that the shorter secondary pleats hold their pleated shape and do not blow radially outward of the filter element 10. Accordingly, "h" should be greater than or equal to "$h_{min}$", in addition to being less than "$h_{max}$". The minimum secondary pleat height "$h_{min}$" is generally dependent on the pleat thickness and the capabilities of the pleating machine, and may also be dependent on the particular filter and diffusion media incorporated in the filter element.

For the pleated filter element 10 set forth in Table I, a preferred minimum secondary pleat height "$h_{min}$" has been found to be 0.250 inches. All secondary pleats "s" having a calculated height "h" less than "$h_{min}$" (but greater than the practical minimum pleat height of 0.200 inches) are provided with an actual height equal to "$h_{min}$". Since the secondary pleats "$s_{33}$, $s_{34}$, $s_{35}$, $s_{36}$ and $s_{37}$", for example, each have an actual height "$h_{33}$, $h_{34}$, $h_{35}$, $h_{36}$ and $h_{37}$", respectively, less than the "$h_{min}$" of 0.250 inches, they are each given a height equal to "$h_{min}$" during production of the pleated filter 10, as shown on lines 15, 27, 39, 53 and 63 in Table II.

Referring to Table II, the remaining secondary pleats "$s_7$, $s_8$, . . . $s_{32}$", as calculated in Table I, are mixed in order and each are positioned between adjacent pairs of primary pleats "P". The secondary pleats "s" may be distributed among the primary pleats "P" in a random manner or in a uniform manner to obtain the largest total number of primary and secondary pleats. In the example shown in Table II, the secondary pleats "s" have been randomly mixed. Alternatively, the secondary pleats "s" may be distributed among the primary pleats "P" in a uniform manner so that the similar distributions of secondary pleat heights "h" may be repeated every ninety degrees of the filter element 10, for example, or every forty-five degrees.

Figure 3A:
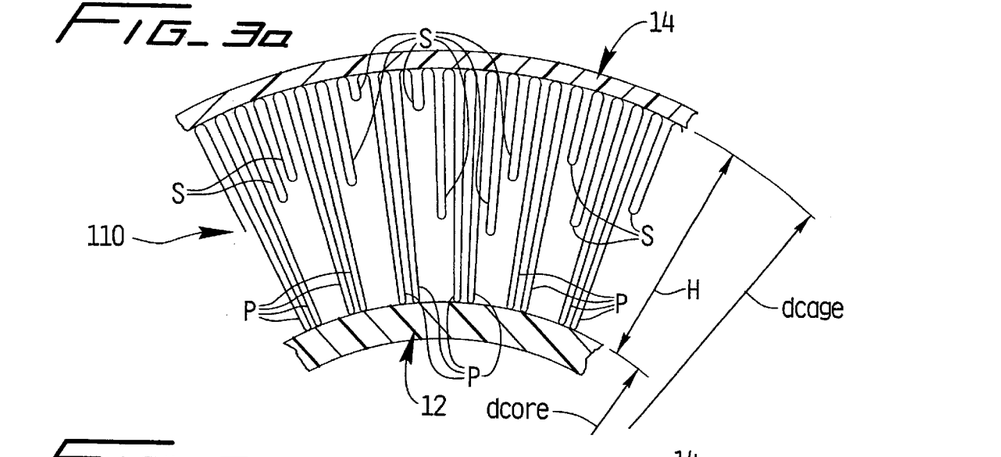
FIGS. 3a–3c are sectional views of cartridge assemblies including other examples of pleated filter elements according to the present disclosure.
Figure 3B:
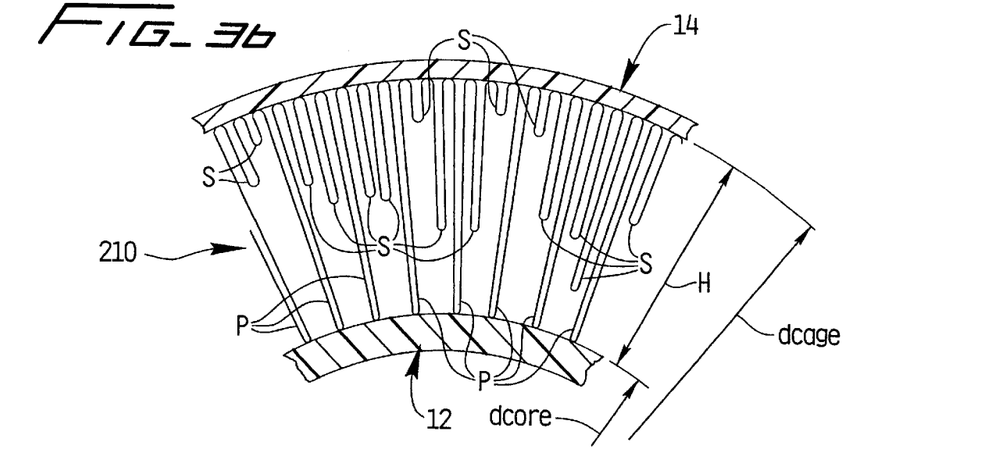
Figure 3C:
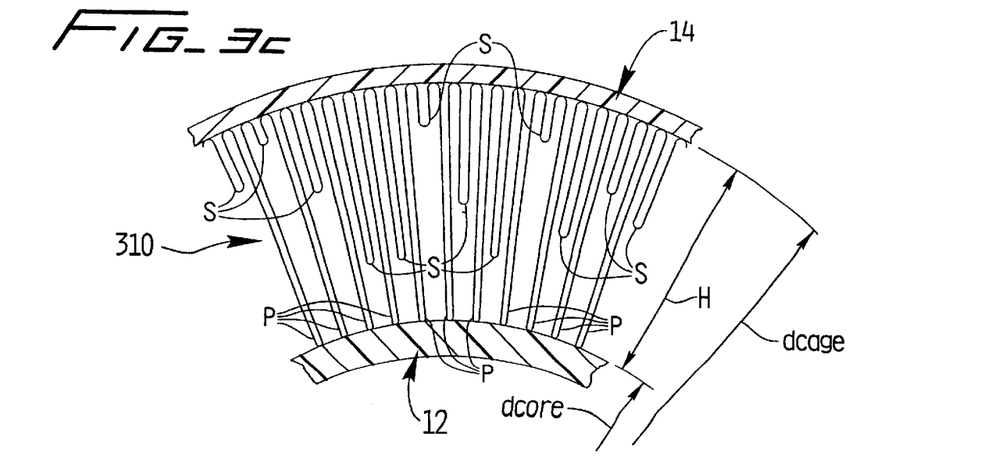

It is envisioned that many variations of the distribution and arrangement of the secondary pleats "s" with respect to the primary pleats "P" are possible without departing from the spirit and scope of the presently disclosed filter element 10. For example, a filter element 110 according to the present disclosure can include two secondary pleats "s" between every adjacent pairs of primary pleats "P", as shown in FIG. 3a; a filter element 210 according to the present disclosure can include two secondary pleats "s" between every two adjacent primary pleats "P", as shown in FIG. 3b; and a filter element 310 according to the present disclosure can include one secondary pleat "s" between every two adjacent primary pleats "P", as shown in FIG. 3c. In addition, although not shown, a filter element according to the present disclosure can have varying numbers of secondary pleats "s" between adjacent primary pleats "P". Again, many variations of the distribution and arrangement of the secondary pleats "s" with respect to the primary pleats "P" are possible without departing from the spirit and scope of the presently disclosed filter element 10.

Referring again to Table II, extra pleats are made at the beginning of the machine instructions, i.e., line 1, and the end of the machine instructions, i.e., line 65, so that a length of the pleated filter composite can be cut at the extra pleats, then formed into a cylindrical shape. Then the cut extra pleats are sealed to each other along a seam by conventional means to retain the pleated filter composite in a cylindrical form.

Benefits of Filter Elements Pleated in Accordance with the Present Disclosure

Filter elements pleated in accordance with the present disclosure have been found to have a far greater surface area usable for filtration than conventional radial pleated filter elements having the same inner and outer diameters, such as the BetaFine D® filter manufactured by Cuno, Incorporated of Meriden, Conn. In general, it has been found that a filter element 10 pleated according to the present invention has about thirty percent (30%) more surface area than a conventional straight radial pleated filter element. In comparison, a conventional W-pleated filter element has only about twenty percent (20%) more surface area than a conventional straight radial pleated filter element.

In addition, a filter element 10 constructed in accordance with the present disclosure has also been found to provide a greater and more consistent filter density between the inner core 12 and the outer cage 14 of a cartridge assembly 8 than either a conventional W-pleated filter (having a uniform repeating pattern of one half pleat between two pairs of fill pleats) or a conventional straight radial pleated filter, as demonstrated here by Table III.

TABLE III

Theoretical Comparison of Pleat Densities

| Diameter intervals "D" between Inner Core and Outer Cage of Cartridge Assembly | Straight Radial Pleated Filter | W-Pleated Filter (uniform pattern of one short pleat between two tall pleats) | Filter element constructed in Accordance with the Present Disclosure |
|---|---|---|---|
| $D_1 = "d_{core}"$ | 100 | 100 | 100 |
| $D_2$ | 89 | 89 | 100 |
| $D_3$ | 80 | 81 | 100 |
| $D_4$ | 73 | 73 | 100 |
| $D_5$ | 67 | 67 | 100 |
| $D_6$ | 62 | 93 | 100 |
| $D_7$ | 58 | 87 | 100 |
| $D_8$ | 54 | 81 | 100 |
| $D_9$ | 51 | 76 | 96 |
| $D_{10} = "d_{cage}"$ | 48 | 72 | 91 |

In Table III, the theoretical pleat densities for a given pleat thickness "t", core outer diameter "$d_{core}$" and cage inner diameter "$d_{cage}$" are calculated and compared for a conventional straight pleated filter, a conventional W-pleated filter, and a filter element 10 pleated according to the present disclosure. The theoretical pleat densities are equal to the number of actual pleats provided by each filter divided by the maximum number of theoretical pleats that can be provided at each diameter interval "D", where "D" is the difference between "$d_{cage}$" and "$d_{core}$" divided by ten. The maximum number of theoretical pleats is equal to the diameter at each interval multiplied by a and divided by the thickness "t" of the pleats. As shown, a filter element 10 constructed in accordance with the present disclosure provides the greater and more consistent pleat density between the inner core 12 and the outer cage 14, as compared with a conventional straight radial pleated filter and a conventional W-pleated filter.

The greater and more consistent filter density of the presently disclosed filter element 10 results in improved inter-pleat support and a more even distribution of loads applied to the filter element. The greater and more consistent filter density, therefore, minimizes pleat migration and binding, and increases the ability of the pleats to retain particles in a pulsating flow system.

Filter elements pleated in accordance with the present disclosure have been found to provide a greater filter life than conventional straight pleated filter elements, such as the BetaFine-D® filter. Furthermore, filter elements pleated in accordance with the present disclosure have been found to have advantages over spiral pleated filter elements, such as the PolyPro XL® filter manufactured by Cuno, Incorporated of Meriden, Conn. In particular, a filter element 10 according to the present disclosure provides filter area and filter density gains similar to a spiral pleated filter element, with an increase in the number of radial flow paths of the filter available at the outer cage 14 of a cartridge assembly 8 containing the filter element 10. In addition, a filter element 10 according to the present invention is more easily inserted into a cage 14 than a spiral pleated filter element, whose pleats must be rolled over, or "spiraled" before being inserted into the cage.

Composite Construction

Preferably, the filter element 10 of the present disclosure comprises a pleated composite including a filter medium 20 and at least one of an upstream diffusion medium 22 and a downstream diffusion medium 24, as shown best in FIG. 1. Here, upstream and downstream refer to the exterior and interior surfaces of the filter element 10 when the filter is being subjected to radially inward fluid flow, or to interior and exterior surfaces of the filter when the filter element is being subjected to radially outward fluid flow.

The diffusion media 22, 24 provide support to the filter medium 20 and enable fluid to evenly flow to or from substantially all portions of the surface of the filter medium 20 so that virtually the entire surface area of the filter medium may be effectively used for filtration. Preferably, the filter element 10 comprises a three-layer composite of a filter medium 20, and both an upstream diffusion medium 22 and a downstream diffusion medium 24.

There are no particular restrictions on the type of filter medium 20 that can be employed in the present filter element 10, and the filter medium can be selected in accordance with the fluid to be filtered and the desired filtering characteristics. The filter medium 20 can be used to filter fluids such as liquids, gases, or mixtures thereof, and may comprise a porous film or a fibrous sheet or mass, or any combination thereof, may have a uniform or graded pore structure and any appropriate effective pore size; may include single or multiple layers; and may be formed from any suitable material, such as a natural material, synthetic polymer, glass, or metal.

According to preferred embodiments of the present disclosure, the filter medium is comprised of one or more sheets of non woven thermoplastic micro fibers. The non woven thermoplastic micro fibers may be melt blown, spunbond, carded, or hydroentangled, for example. In addition, the filter medium may be calendered, or compressed, to further modify its porosity. For lower temperature filtering applications (i.e., below 180° F.), the thermoplastic can comprise polypropylene, for example, while for higher temperature applications (i.e., above 180° F.) or chemical compatibility with other fluids, the thermoplastic can comprise nylon, polyester or melt-processible fluoropolymer, for example.

The filter medium 20 may comprise a single layer, or a plurality of layers. Furthermore, it is possible for the filter medium 20 to include two or more layers having different filtering characteristics (e.g., one layer acting as a pre-filter for the second layer). The filter medium is preferably provided in sheet form, as opposed to being melt blown directly onto the diffusion medium, for example, such that the sheet can be inspected prior to being incorporated into the filter. The use of discrete sheets of depth filter medium has been found to simplify quality control inspection of the filter medium and make the physical properties of each filter cartridge more consistent. Controlling the consistency of the physical properties of the filter medium provides a unique ability to achieve sharp, well-defined, and optimized control over the removal efficiency and dirt capacity of the resulting filter cartridge.

The diffusion media 22, 24 are preferably distinct from the filter medium 20. The upstream and downstream diffusion media 22, 24 can be made of any materials such as a mesh, screen or a porous woven or non-woven sheet.

Meshes and screens (also called netting) come in various forms. For high temperature applications, a metallic mesh or screen may be employed, while for lower temperature applications, a polymeric mesh may be particularly suitable. Polymeric meshes come in the form of woven meshes and extruded meshes, either of which may be employed. Specific examples of suitable extruded polymeric meshes are those available from Nalle Plastics of Austin, Tex. under the trade names Naltex®, Zicot®, and Ultraflo®. Other examples of suitable extruded polymeric meshes are those available from Applied Extrusion Technologies, Inc. of Middletown, Del. under the trade name Delnet® extruded polypropylene mesh, which can be extruded at various strand orientations.

Meshes are particularly suitable as the diffusion media 22, 24 when the filter medium 20 is a fibrous laid-down medium. Diamond netting, e.g., Naltex LWS®, is particularly suitable for pleated filter applications because it can be readily pleated with short pleat heights, holds a set well after being heated, and has good fluid distribution properties.

When the filter medium 20 is a membrane, a sheet of woven or non-woven fabric may be more suitable for use as the diffusion media 22, 24 since a fabric is usually smoother than a mesh and produces less abrasion of adjoining layers of the filter composite. An example of a suitable non-woven fabric for use as a diffusion medium is a polyester non-woven fabric sold under the trade designation Reemay 2011 by Reemay, Inc. of Old Hickory, Tenn.

The upstream and downstream diffusion media 22, 24 can be of the same or different construction. Alternatively, the upstream and downstream diffusion media 22, 24 may have different characteristics and these characteristics may be varied to provide a desired effect. For example, where the overall thickness of the filter composite is fixed, the thickness of the upstream diffusion medium 22 may be made greater than the thickness of the downstream diffusion medium 24.

An example of a pleated filter element 10 constructed according to the present disclosure includes an upstream diffusion medium 22 of Delnet® extruded polypropylene mesh, and a downstream diffusion medium 24 of Typar T-135® spunbond, non-woven polypropylene, available from Reemay Inc. Another example of a pleated filter element 10 constructed according to the present disclosure includes an upstream diffusion medium 22 of Naltex Symmetrical Filtration Netting LWS® 37-3821 extruded polypropylene mesh, and a downstream diffusion medium 24 of the Typar T-135® spunbond, non-woven polypropylene.

Optimum Combination of Total Filter Area and Upstream Diffusion Medium

It has been found, that a filter element 10 pleated in accordance with the present disclosure should not always be made to have the most filter area that will fit between a core and a cage of a cartridge assembly. Referring to Table IV, for example, an optimum combination of total filter area and upstream diffusion medium 22 for a filter element 10 pleated in accordance with the present disclosure has been found to depend on the particular type and sizes of contaminants to be filtered.

TABLE IV

Filter Area v. Upstream Diffusion Layers

| Filter Rating (microns) | Contaminant size (microns) | Length of Filter Composite (feet) | Upstream Diffusion Layer | Life (grams) |
|---|---|---|---|---|
| 0.2 | 0–10 | 9.2 | 5 mil Delnet ® | 198 |
| 0.2 | 0–10 | 7.3 | 13 mil Nalle LWS ® | 150 |
| 0.5 | 0–10 | 9.2 | 5 mil Delnet ® | 201 |
| 0.5 | 0–10 | 8.5 | 13 mil Nalle LWS ® | 258 |
| 0.5 | 0–10 | 7.3 | 20 mil Nalle LWS ® | 284 |
| 1 | 0–10 | 9.2 | 5 mil Delnet ® | 192 |
| 1 | 0–10 | 8.0 | 13 mil Nalle LWS ® | 254 |
| 1 | 0–10 | 7.3 | 20 mil Nalle LWS ® | 306 |
| 2.5 | 0–150 | 9.2 | 5 mil Delnet ® | 177 |
| 2.5 | 0–150 | 7.3 | 20 mil Nalle LWS ® | 392 |
| 5 | 0–150 | 10.0 | 5 mil Delnet ® | 94 |
| 5 | 0–150 | 7.8 | 20 mil Nalle LWS ® | 282 |
| 10 | 0–150 | 8.4 | 10 mil Delnet ® | 239 |
| 10 | 0–150 | 7.8 | 20 mil Nalle LWS ® | 331 |
| 20 | 0–150 | 8.4 | 10 mil Delnet ® | 262 |
| 20 | 0–150 | 7.8 | 20 mil Nalle LWS ® | 386 |
| 0–70 | 0–150 | 8.4 | 5 mil Delnet ® | 198 |
| 40–70 | 0–150 | 7.8 | 20 mil Nalle LWS ® | 376 |

Table IV shows the results of single pass tests on various filter elements pleated in accordance with the present disclosure. Each single pass test was performed at a flow rate of three gallons per minute, with water containing between about 0.39 to about 1.0 grams of contaminant per gallon of water. Two standard contaminants were used: 0–150 micron contaminant (ISO COARSE, A.T.D. 12103-1, A4, available from Powder Technologies, Inc. of Burnsville, Minn.); and 0–10 micron contaminant (A.T.D. nominal 0–10 microns, also available from Powder Technologies, Inc).

All of the filter elements tested were pleated in accordance with the present disclosure, included a filter medium 20 of non woven thermoplastic micro fibers, a downstream diffusion medium 24 of Typar T-135® spunbond, non-woven polypropylene, an outer diameter of about 2.5 inches and a length of about 10 inches. The life of a filter for purposes of the tests illustrated in Table IV is defined as the amount of contaminant challenged for the pressure drop across the filter to increase by 20 psid due to contaminant loading in the tested filter.

Based upon the results shown in Table IV, for example, it has been found that a filter element 10 pleated in accordance with the present disclosure, having a rating of 0.2 microns and for filtering contaminants of 0–10 microns, preferably will have a filter composite length of at least 9.0 feet and an upstream diffusion layer 22 of 5 mil Delnet®. However, filter elements 10 pleated in accordance with the present disclosure, having ratings of 0.5, 1.0 and 2.5 microns, and for filtering contaminants of 0–150 microns, preferably will each have a filter composite length of not more than about 7.3 feet and an upstream diffusion layer 22 of 20 mil Nalle LWS®. In addition, filter elements 10 pleated in accordance with the present disclosure, having ratings of 5.0, 10.0, 20.0 and 40.0 to 70.0 microns, and for filtering contaminants of 0–150 microns, preferably will each have a filter composite length of not more than about 7.8 feet and an upstream diffusion layer 22 of 20 mil Nalle LWS®.

The Cartridge Assembly

The cylindrical core 12 of the cartridge assembly 8 supports the inner periphery of the filter element 10 against forces in the radial direction and also helps to give the filter element axial strength and rigidity against bending. The core 12 may be of conventional design and may be made of any material having sufficient strength and which is compatible with the fluid being filtered. Openings 26 are formed through the core to permit the passage of fluid between the outside and the center of the core. An alternative core would include a splined shaft, or a core that can be removed during manufacturing. The outer cage 14 of the cartridge assembly 8 may be of conventional design with openings 28 formed therein for the passage of fluid. Alternative cages include expandable mesh sleeve, a porous extruded tube, or a wrap consisting of cord, woven or non-woven material. The material of which the cage 14 is made can be selected based on the fluid being filtered and the filtering conditions.

Usually, a cartridge assembly 8 according to the present invention will be equipped with end caps 30 at one or both ends. The end caps 30 can be either blind or open end caps, and the material of which they are formed and their shape can be selected in accordance with the filtering conditions and the materials of the members to which the end caps are to be joined. Preferably, the end caps 30 are attached to the filter element 10, but they may also be attached to the core 12 or the cage 14. Conventional techniques can be used to attach the end caps 30 to the cartridge assembly 8, such as by use of an epoxy, by thermobonding, or by spin welding.

Although the presently disclosed filter element 10 has been described and illustrated with respect to a preferred embodiment, it is apparent that modifications and changes can be made thereto without departing from the spirit and scope of the presently disclosed filter element as defined by the following claims.

What is claimed is:

1. A cylindrical filter element comprising:
a plurality of longitudinally extending pleats including outwardly radiating primary pleats and inwardly radiating secondary pleats, at least one secondary pleat positioned between two adjacent primary pleats, each primary pleat having a radial height, each secondary pleat having a radial height that is less than the radial height of each primary pleat and different from the radial height of each other secondary pleat.

2. A filter element according to claim 1, wherein one secondary pleat is positioned between two adjacent pairs of primary pleats.

3. A filter element according to claim 1, wherein two secondary pleats are positioned between two adjacent pairs of primary pleats.

4. A filter element according to claim 1, wherein one secondary pleat is positioned between two adjacent primary pleats.

5. A filter element according to claim 1, wherein two secondary pleats are positioned between two adjacent primary pleats.

6. A filter element according to claim 1, wherein the maximum number of primary pleats in the filter element is about equal to:

$$\frac{\pi d_{inner}}{t}$$

where "$d_{inner}$" is equal to an inner diameter of the filter element, and "t" is equal to a thickness of the pleats.

7. A filter element according to claim 1, wherein the maximum number of secondary pleats in the filter element is about equal to:

$$\frac{(d_{outer} - d_{inner})\pi}{t}$$

where "$d_{inner}$" is equal to an inner diameter of the filter element, "$d_{outer}$" is equal to an outer diameter of the filter element, and "t" is equal to a thickness of the pleats.

8. A filter element according to claim 7, wherein the number of secondary pleats included in the filter element is less than the maximum number of secondary pleats.

9. A filter element according to claim 1, wherein the filter element has a maximum secondary pleat height associated therewith, and the filter element is constructed in such a manner so that each secondary pleat has a radial height that is less than or equal to the maximum secondary pleat height.

10. A filter element according to claim 1, wherein the filter element has a minimum secondary pleat height associated therewith, and the filter element is constructed in such a manner so that each secondary pleat has a radial height that is greater than or equal to the minimum secondary pleat height.

11. A filter element according to claim 1, wherein the filter element comprises a pleated composite including a filter medium and at least one of an upstream diffusion medium and a downstream diffusion medium.

12. A filter element according to claim 11 wherein the at least one diffusion medium comprises one of an extruded netting and a spunbond, non-woven polymer.

13. A filter element according to claim 11, wherein the at least one diffusion medium comprises a thermoplastic selected from the group consisting of polypropylene, nylon, polyester and fluoropolymer.

14. A filter element according to claim 11 including an upstream diffusion medium and a downstream diffusion medium, wherein the upstream diffusion medium comprises extruded polypropylene netting, and the downstream diffusion medium comprises spunbond, non-woven polypropylene.

15. A filter element according to claim 11 wherein the filter medium comprises a thermoplastic selected from the group consisting of polypropylene, nylon, polyester and fluoropolymer.

16. A filter element according to claim 11 wherein the filter medium comprises non woven micro fibers.

17. A filter element according to claim 11, wherein the pleated composite is heat-set.

18. A filter element according to claim 1, wherein the filter element comprises a pleated composite including:
a) a filter medium of non woven thermoplastic polypropylene micro fibers;
b) a downstream diffusion medium of spunbond, non-woven polypropylene; and
c) an upstream diffusion layer of extruded polypropylene mesh.

19. A cartridge assembly including the filter of claim 1 and further comprising a cylindrical core coaxially positioned within the cylindrical filter element, and a cylindrical cage coaxially positioned about the cylindrical filter element.

20. A cylindrical filter element comprising:
a plurality of longitudinally extending pleats including outwardly radiating primary pleats and inwardly radiating secondary pleats, at least one secondary pleat positioned between two adjacent primary pleats, each primary pleat having a radial height, each secondary pleat having a radial height that is less than the radial height of each primary pleat and different from the radial height of at least one other secondary pleat, wherein the maximum number of secondary pleats in the filter element is about equal to:

$$\frac{(d_{outer} - d_{inner})\pi}{t}$$

where "$d_{inner}$" is equal to an inner diameter of the filter element, "$d_{outer}$" is equal to an outer diameter of the filter element, and "t" is equal to a thickness of the pleats.

21. A filter element according to claim 20, wherein the maximum number of primary pleats in the filter element is about equal to:

$$\frac{\pi d_{inner}}{t}.$$

22. A filter element according to claim 21, wherein the filter element includes less than the maximum number of primary pleats.

23. A filter element according to claim 21, wherein the filter element includes less than the maximum number of secondary pleats.

24. A filter element according to claim 21, wherein each secondary pleat has a different radial height.

25. A filter element according to claim 21, wherein one secondary pleat is positioned between two adjacent pairs of primary pleats.

26. A filter element according to claim 21, wherein two secondary pleats are positioned between two adjacent pairs of primary pleats.

27. A filter element according to claim 21, wherein one secondary pleat is positioned between two adjacent primary pleats.

28. A filter element according to claim 21, wherein two secondary pleats are positioned between two adjacent primary pleats.

* * * * *